(12) United States Patent
Ramesh et al.

(10) Patent No.: US 8,472,912 B2
(45) Date of Patent: Jun. 25, 2013

(54) LOW-COMPLEXITY DIVERSITY USING PREEQUALIZATION

(75) Inventors: Sridhar Ramesh, Carlsbad, CA (US); James Qiu, Carlsbad, CA (US); Sugbong Kang, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 332 days.

(21) Appl. No.: 12/966,905

(22) Filed: Dec. 13, 2010

(65) Prior Publication Data

US 2011/0310948 A1    Dec. 22, 2011

Related U.S. Application Data

(60) Provisional application No. 61/285,945, filed on Dec. 11, 2009.

(51) Int. Cl.
*H04B 1/16* (2006.01)

(52) U.S. Cl.
USPC ........... 455/334; 455/101; 455/137; 455/323; 375/347

(58) Field of Classification Search
USPC .. 455/101, 132–137, 313, 323, 334; 375/340, 375/347, 349
See application file for complete search history.

(56) References Cited

U.S. PATENT DOCUMENTS

| | | | |
|---|---|---|---|
| 5,982,817 A | 11/1999 | Wuppermann | |
| 6,088,401 A | 7/2000 | Saito | |
| 6,989,733 B2 | 1/2006 | Simonsen et al. | |
| 7,277,482 B2 | 10/2007 | Wreschner et al. | |
| 7,346,136 B1 | 3/2008 | Aiello | |
| 7,701,917 B2 | 4/2010 | Mantravadi et al. | |

(Continued)

FOREIGN PATENT DOCUMENTS

WO    WO 2011/072305    6/2011

OTHER PUBLICATIONS

International Search Report and Written Opinion corresponding to the PCT Application No. PCT/US2008/079365, mailed on Dec. 12, 2008, 10 pages.

(Continued)

*Primary Examiner* — Nhan Le
(74) *Attorney, Agent, or Firm* — McAndrews, Held & Malloy, Ltd.

(57) ABSTRACT

A diversity receiver includes a first RF front end module for receiving a first RF signal, and frequency converting the first RF signal and outputting a first diversity signal, a second RF front end module for receiving a second RF signal, frequency converting the second RF signal and outputting a second diversity signal, a first converter for converting the first diversity signal to a first time-domain signal, a second converter for converting the second diversity signal to a second time-domain signal, a first transformer for translating the first time-domain signal to a first frequency-domain signal, a second transformer for translating the second time-domain signal to a second frequency-domain signal, a first pre-equalizer for equalizing the first frequency-domain signal, a second pre-equalizer for equalizing the second frequency-domain signal, and a combiner for combining the first and second pre-equalized frequency-domain signals. The diversity receiver further includes a channel estimator having a mirror window.

15 Claims, 5 Drawing Sheets

U.S. PATENT DOCUMENTS

| | | | |
|---|---|---|---|
| 2004/0137863 | A1 | 7/2004 | Walton et al. |
| 2004/0190640 | A1 | 9/2004 | Dubuc et al. |
| 2005/0280569 | A1 | 12/2005 | Park |
| 2008/0025424 | A1 | 1/2008 | Yang et al. |
| 2008/0075209 | A1* | 3/2008 | Li et al. ............ 375/347 |
| 2008/0083000 | A1 | 4/2008 | Orrell et al. |
| 2008/0219339 | A1 | 9/2008 | Chrabieh et al. |
| 2009/0011722 | A1 | 1/2009 | Kleider et al. |
| 2009/0042524 | A1 | 2/2009 | Maiuzzo |
| 2009/0098844 | A1 | 4/2009 | Anandakumar et al. |
| 2009/0207927 | A1* | 8/2009 | Watanabe et al. ............ 375/260 |
| 2009/0213724 | A1 | 8/2009 | Swarts et al. |

OTHER PUBLICATIONS

Notice of Allowance for U.S. Appl. No. 12/247,908, mailed on Apr. 21, 2011, 7 pages.

International Search Report and Written Opinion corresponding to the PCT Application No. PCT/US2010/060145, mailed Feb. 16, 2011, 12 pages.

International Preliminary Report on Patentability and Written Opinion for Application No. PCT/US2010/060145, mailed on Jun. 21, 2012, 7 pages.

* cited by examiner

LOW-COMPLEXITY DIVERSITY USING PREEQUALIZATION

CROSS-REFERENCES TO RELATED APPLICATIONS

The present application claims benefit under 35 USC 119 (e) of U.S. provisional application No. 61/285,945, filed Dec. 11, 2009, entitled "Low Complexity Diversity Using Preequalization," the content of which is incorporated herein by reference in its entirety. The present invention is related to U.S. application Ser. No. 12/247,908, filed Oct. 8, 2008, entitled "Low-Complexity Diversity Using Coarse FFT and Subband-Wise Combining," the content of which is incorporated herein by reference in its entirety.

BACKGROUND OF THE INVENTION

Many current wireless receivers use multiple antennas to reduce multipath and interference on signal reception. The utilization of multiple receive antennas can provide a diversity gain.

A technique for low-complexity antenna diversity is described in an article entitled "Low-Complexity Antenna Diversity Receivers for Mobile Wireless Applications," by Zhang, C. N., Ling, C. C., International Journal on Wireless Personal Communications, pp. 65-8. The authors show the viability of combining diversity antenna signals using front-end analog circuits to achieve significant diversity gain in comparison to conventional diversity techniques that require duplicate signal paths and demodulators. The technique described in the article provides hardware savings by eliminating one of the demodulators. Furthermore, since each antenna is receiving the same desired channel, the need for duplicate local oscillator is eliminated. Likewise, channel selection filters, amplifiers and data conversion hardware can be shared.

Patent application Ser. No. 12/247,908, filed Oct. 8, 2008, entitled "Low-Complexity Diversity Using Coarse FFT and Subband-Wise Combining," the content of which is incorporated herein by reference in their entirety, disclose a diversity combining receiver which combines the diversity signals prior to baseband and demodulator processing, as shown in FIG. 1.

FIG. 1 is a block diagram of a three-antenna diversity receiver 100 described in "Low-Complexity Diversity Using Coarse FFT and Subband-Wise Combining", patent application Ser. No. 12/247,908, filed Oct. 8, 2008. Although receiver 100 is shown as including three paths (channels), namely paths 140, 145 and 150, it is understood that a diversity receiver, in accordance with the above referenced patent application, may have any number of paths. Path 140 is shown as including an amplifier 102-1, a frequency conversion module 104-1, and an analog-to-digital converter 306-1. Path 145 is shown as including an amplifier 102-2, a frequency conversion module 104-2, and an analog-to-digital converter 106-2. Path 150 is shown as including an amplifier 102-3, a frequency conversion module 104-3, and an analog-to-digital converter 106-3.

Each amplifier 102-$i$, where i is an index ranging from 1 to 3, is configured to receive and amplify an input signal received from an associated antenna 130-$i$. In one embodiment, each amplifier 102-$i$ may be a Low Noise Amplifier (LNA). In another embodiment, each amplifier 302$_i$ may be a LNA having a variable gain. Amplifier 102-$i$ may be configured as a single-stage or multi-stage amplifier.

The output signal of amplifier 102-$i$ is shown as being applied to an associated frequency conversion module 104-$i$. Frequency conversion modules 104-$i$ are shown as being mixers in exemplary embodiment. Each mixer 104-$i$ is configured to frequency down-convert the received signal using the oscillating signal generated by local oscillator 148. The signal whose frequency is down converted by mixer 104-$i$ is converted to a digital signal by analog-to-digital (ADC) converter 106-$i$. FFT module 108-$i$ transforms the time-domain digitized signal into a frequency domain using $2^m$ points, as described further below.

Assume that the bandwidth of the signals $AS_i$ supplied by ADC 106$_i$ is BW. For a particular wireless channel, the frequency selectivity has a coherence bandwidth CBW, which is the frequency bandwidth across which the channel can be approximated as a flat channel. CBW is inversely proportional to the delay spread of the channel. The delay spread can, in turn, be extracted from the channel's impulse response. Parameter K which is defined by rounding the ratio (BW/CBW) provides a guideline for the number of points the FFT 108-$i$ may require, by choosing the smallest m such that $2^m >= K$.

The bin (or subband) output signals FSi of the associated FFT modules 108-$i$ may be combined after cophasing or combined using MRC, hence referred to herein to as subband MRC. The SNR of each subband may be estimated using any one of a number of conventional techniques to implement MRC. For example, relative subband amplitude combined with gain information available in the analog front end may be used to provide subband-wise signal strength information. The resulting signal CS1 is transformed back to time domain by IFFT module 312. The output of IFFT module 112 is filtered by lowpass filters 114, 116, and amplified by variable gain stage 118. The output of variable gain stage 118 is applied to a demodulator 120.

As shown in FIG. 1, bin-wise combiner 110 combines the output signals of FFT modules 108-1, 108-2 and 108-3 to generate signal CS. The combined signal CS is, in turn, applied to IFFT 112 that generates signal DS by transforming signal CS from frequency domain to time domain. The parameter m, which is the number of points used in FFT modules 108-$i$, may be selected independently from the type of signal modulation being received. In an exemplary embodiment, an OFDM system may have 4096 subbands and, during demodulation, requires a 4096-point FFT. In accordance with the present invention, a significantly smaller FFT module may be used to perform the diversity processing, thus greatly reducing complexity and power consumption. The present invention may be equally applied to non-OFDM signals (e.g. single-carrier or CDMA signals) with relatively the same degree of effectiveness.

BRIEF SUMMARY OF THE INVENTION

According to an embodiment of the present invention, a wireless diversity receiver includes, in part, a first RF front end module configured to receive a first RF signal and frequency convert the first RF signal and output a first diversity signal, a second RF front end module configured to receive a second RF signal and frequency convert the second RF signal and output a second diversity signal, a first converter configured to convert the first diversity signal to a first digital time-domain signal, a second converter configured to convert the second diversity signal to a second digital time-domain signal, a first transformer module for translating the first time-domain signal to a first frequency-domain signal, a second transformer module for translating the second time-domain signal to a second frequency-domain signal, a first pre-equalizer for equalizing the first frequency-domain signal, a second pre-equalizer for equalizing the second frequency-domain signal, and a combiner coupled to the first and second pre-equalizers and being configured to combine the first pre-equalized frequency-domain signal and the second pre-equalized frequency-domain signal. The diversity receiver further includes a first digital front end processing unit interposed between the first converter and the first transformer module; the first digital front end processing unit is configured to filter and calibrate the first diversity signal. The diversity receiver also includes a second digital front end processing unit that is interposed between the second converter and the second transformer module, the second digital front end processing unit is configured to filter and calibrate the second diversity signal. Additionally, the diversity receiver includes a channel estimator coupled to the combiner, wherein the channel estimator includes a mirror channel estimation window.

In another embodiment of the present invention, a method of combining signals in a diversity receiver includes receiving an RF signal in each of a plurality of diversity signal paths, frequency converting each of the RF signals to a corresponding frequency-converted diversity signal, converting each of the frequency-converted diversity signal to an associated digital time-domain diversity signal, translating each of the associated digital time-domain diversity signal to an associated frequency-domain signal, pre-equalizing each frequency-domain signal, and combining the pre-equalized frequency-domain signals to obtain a combined signal.

Embodiments of the present invention can provide many benefits over conventional approaches. The features and advantages of the present invention will become more apparent from the detailed description set forth below when taken in conjunction with the drawings.

DETAILED DESCRIPTION OF THE INVENTION

Figure 1:
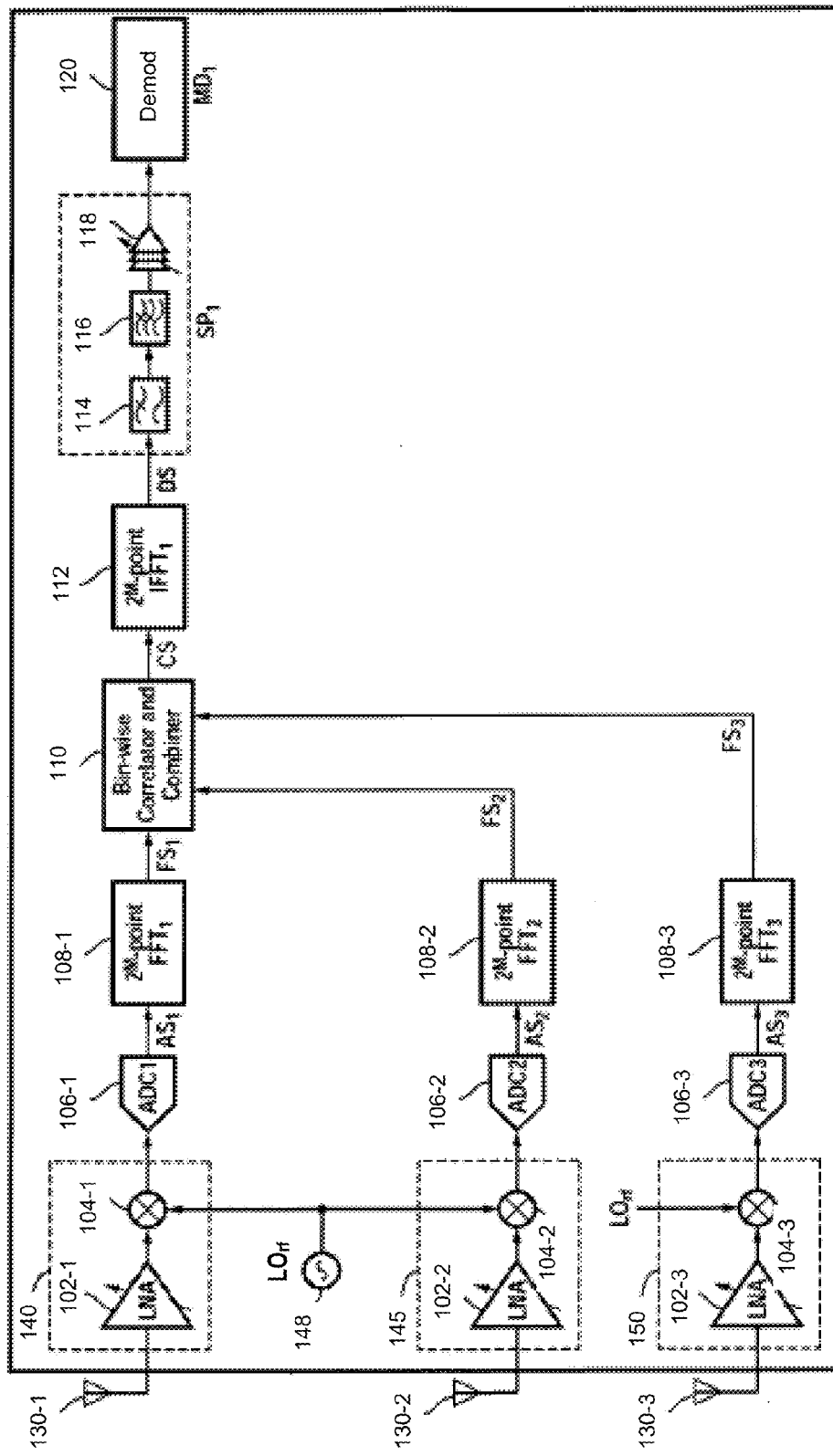
FIG. 1 is a simplified block diagram of a low-complexity diversity receiver.
Figure 2:
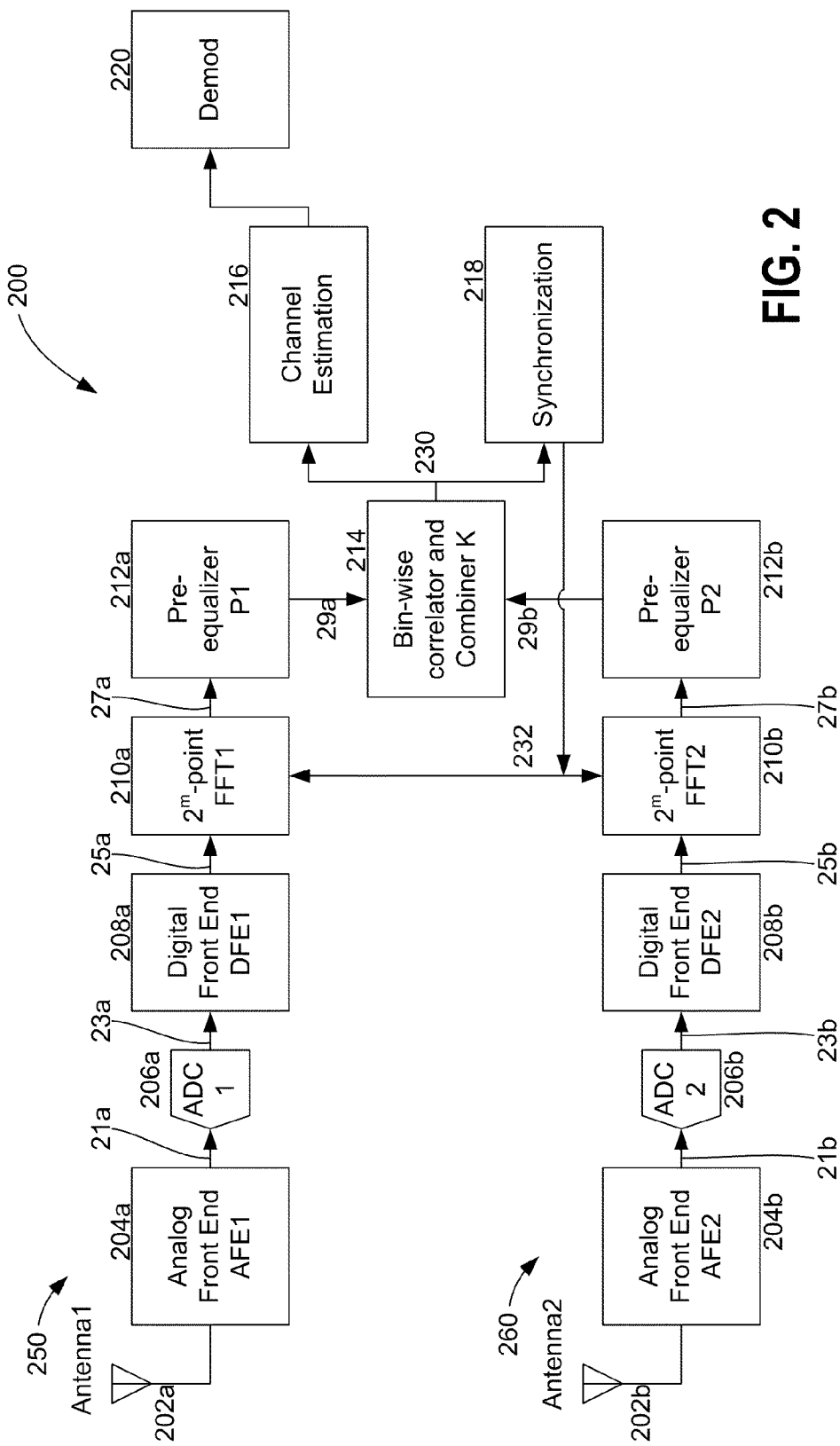
FIG. 2 is a simplified block diagram of a diversity receiver according to an embodiment of the present invention.

FIG. 2 is a simplified block diagram of a diversity receiver 200 according to an embodiment of the present invention. In an exemplary embodiment, the diversity receiver includes a first path 250 and a second path 260, but it should be understood that embodiments of the disclosed diversity received can have a plurality of N paths, where N is more than two. Although the first and second paths share some common signals such as the local oscillator frequency (not shown), the sampling clock rate (not shown), signals received from these two paths are independent from each other. The advantage of this approach is that it allows each signal path to be individually pre-equalized. That is, a frequency-dependent phase and amplitude can be applied to each diversity signal before combining. Although signals in each receive paths are shown as a signal, the signals may include be complex signals including I and Q components. Signals described in embodiments of the diversity receiver are not limited to orthogonal frequency division multiplexed (OFDM) systems having pilot tones dispersed with the OFDM signals, the received signal can be cellular signals such as in CDMA2000 cellular systems.

Each of the receive paths of the diversity receiver 200 includes an antenna 202 coupled to an analog front end (AFE) module 204 that is configured to frequency convert the received RF signal to an intermediate frequency signal or to a baseband signal. An analog-to-digital (ADC) converter coupled to the AFE module converts the analog frequency-converted baseband signal 21 to a time-domain diversity signal 23, which is a digital representation of the frequency-converted signal 21. A digital front end (DFE) module may be interposed between the ADC and a transform module 210. In an embodiment, the digital time-domain diversity signal may bypass the DFE. In another embodiment, the digital time-domain diversity signal passes through the DFE that may perform filtering and calibration of the diversity signal. For example, the AFE module may have some impediments that causes some phase and/or amplitude imbalances in the I and Q components. Those impediments can be corrected by the digital front end module 208. The transform module 210 transforms the time-domain digitized diversity signal 25 into a frequency-domain signal 27. In an embodiment, the transform module 210 can be a $2^m$-point Fast Fourier Transform (FFT).

In an embodiment, the baseband signal 21 applied to the ADC 206 has a bandwidth BW. For a particular wireless channel, the frequency selectivity has a coherence bandwidth CBW, which is the frequency bandwidth across which the channel can be approximated as a flat channel. CBW is inversely proportional to the delay spread of the channel. In an embodiment, the delay spread can be extracted from an channel impulse response. We define a factor K that is the rounding ratio (BW/CBW) that provides a guideline for the number of points the FFT 210 may require, by choosing the smallest m such as $2^m$ is greater than or equal to the factor K. In an embodiment, if the coherence bandwidth is large, the complexity and the computation of the transform module can be reduced to save power.

The transform module 210 provides a frequency-domain signal 27 having a number of bins or subbands corresponding to the number of the $2^m$ points. Each bin or subband of the frequency-domain signal may be treated as having a flat fading channel characteristic. A pre-equalizer 212 coupled to the transform module 210 may include suitable logic and/or circuitry to modify amplitude and phase of each bin received. The modification may be performed by multiplying the bins with an associated complex channel. In an embodiment, the complex channel of each receive path may be obtained by interpolating the extracted pilot tones dispersed within the frequency-domain signal 27.

The pre-equalized bins of each transform module 210a and 210b are then fed to a combiner 214. In an embodiment, the combiner 214 includes a bin-wise correlator that correlates each of the first number of bins in the first receive path with each of the second number of bins in the second receive path. The correlated products are then summed together to provide a combined signal 230. In an embodiment, the bin may be combined after co-phasing. In another embodiment, the bin may be combined using MRC. The SNR of each bin or subband may be estimated using any one of a number of conventional techniques to implement MRC. In an embodiment, relative bin amplitude combined with gain information available in the digital front end module 208 may be used to provide bin-wise signal strength information. The combined signal 230 is then provided to a channel estimation module 216 and a synchronization block 218.

In an embodiment, signals 23a and 23b may bypass the digital front end modules 208a and 208b to provide directly to the transform modules 210a and 210b. In an exemplary embodiment, the diversity receiver may combine diversity signals in the combiner 214 using techniques described in the U.S. application Ser. No. 12/247,908. During the initial synchronization and mode detection, the pre-equalizer 212a and 212b can be bypassed.

Figure 3A:
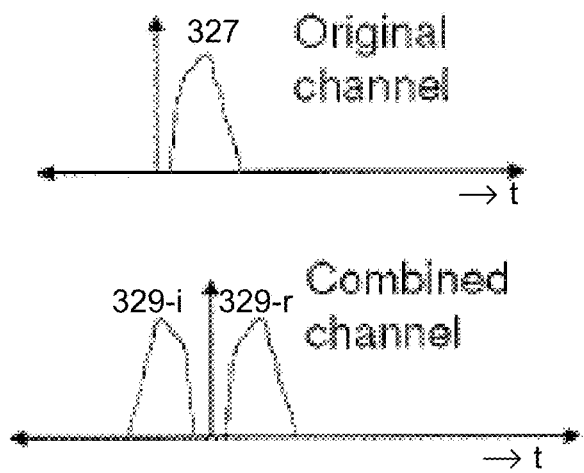
FIG. 3a-c are simplified diagrams illustrating a mirror channel estimation window in the time-domain for capturing a combined signal according to an embodiment of the present invention.
Figure 3B:
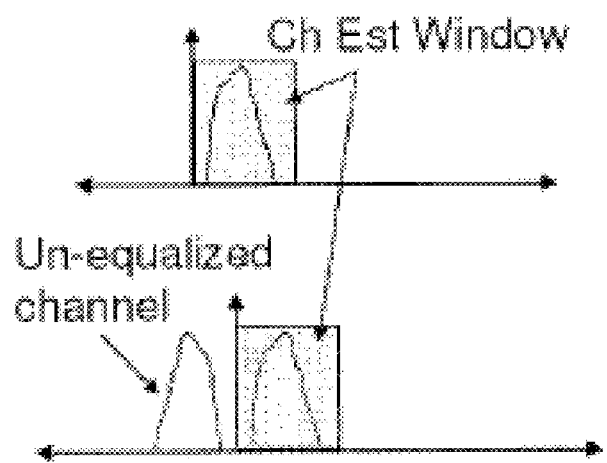
Figure 3C:
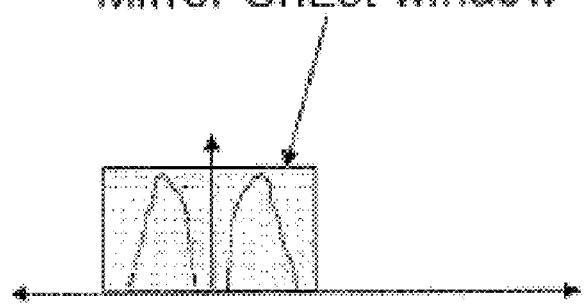

FIG. 3a-c are diagrams illustrating signals along a receive path according to an embodiment of the present invention. The signals are provides in time-domain. Signal 327 represents the signal output 27a or 27b before the pre-equalizer (see also FIG. 2). Due to the fact that the baseband time domain signal and its frequency transform are represented in complex notation, the signal and its pre-equalized output contain both real and imaginary components. FIG. 3b shows the prior art channel estimation window. FIG. 3c shows the use of a time domain window according to an embodiment of the present invention, where the window used in the time-domain can be mirrored to capture impulse response energy that is mirrored about the impulse response.

Figure 4:
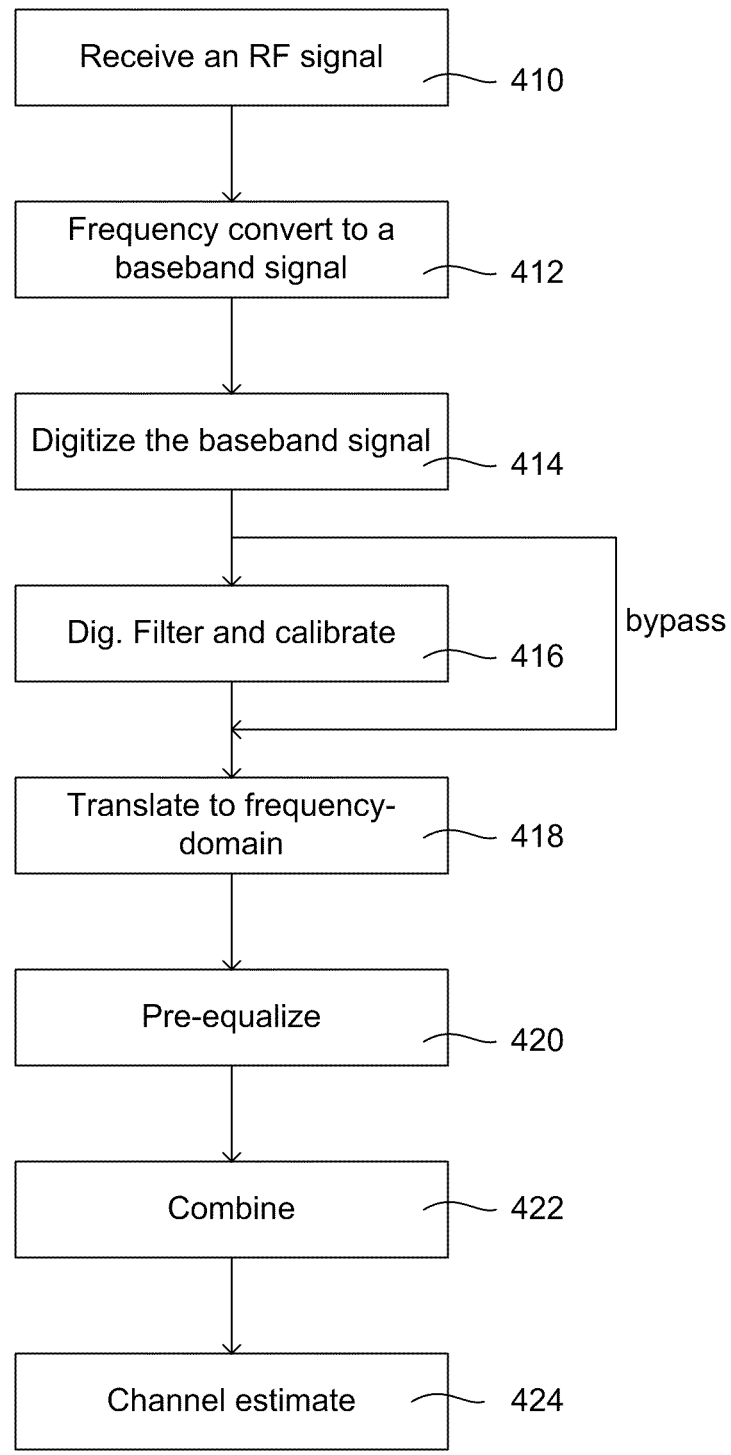
FIG. 4 is a flow chart illustrating combining signals in a diversity receiver according to an embodiment of the present invention.

FIG. 4 is a flow chart illustrating combining signals in a diversity receiver according to an embodiment of the present invention. In step 410, the analog front end module on each of N receive paths receive a RF signal, where N is an integer greater than 1. The analog front end module includes a low noise amplifier LNA and a frequency down-converter that frequency down-convert the RF signal to an intermediate signal or a baseband signal (step 412). In step 414, the intermediate signal or baseband signal is digitized to obtain a digital diversity signal. The diversity signal may be further digitally processed in step 416 to correct impediments such as I/Q phase offset, I/Q gain imbalance, that are introduced in the analog front end module. The digital processing in step 416 may include a channel estimation based on pilot signals that are dispersed in the diversity signal. In an embodiment, the digital processing operation extracts the pilot signals and interpolates them to obtain a channel estimation. In an embodiment, step 416 may be optional and can be bypassed.

In step 418, the digital baseband signal is transformed to a frequency-domain diversity signal having a number of bins (subbands). In an embodiment, the frequency-domain transformation can be performed using a $2^m$-point FFT. In step 420, the number of bins will be pre-equalized. In an embodiment, the pre-equalization may be based on extracting and interpolating the pilot signals, which are typically interspersed in the channel in some predetermined fashion. The pre-equalization may remove the effects of the channel and significantly reduces the delay spread of the signal in each receive path.

In step 422, the pre-equalized diversity signal of each path is combined. In an embodiment, the combining may use conventional maximum ration combing (MRC) or other combining approaches to combine the bins (subbands) from each FFT before sending them to the next step. In step 424, the channel is estimated based on the combined signal. The channel estimation may include applying a mirror window (as described in FIG. 3) that widens the channel estimation window to account for the known effects of spread resulting in the pre-equalization. In an exemplary embodiment, the interpolation of the channel is performed by the use of a time domain window, the window used in time-domain can be mirrored to capture channel impulse response energy that is mirrored about the impulse response.

Because pre-equalization is tolerant to errors, i.e., the pre-equalization does not require the same level of performance as the channel estimation performed by the channel estimator (in step 424), much simpler algorithms and signal processing can be used for the pre-equalization to reduce the system complexity.

Figure 5:
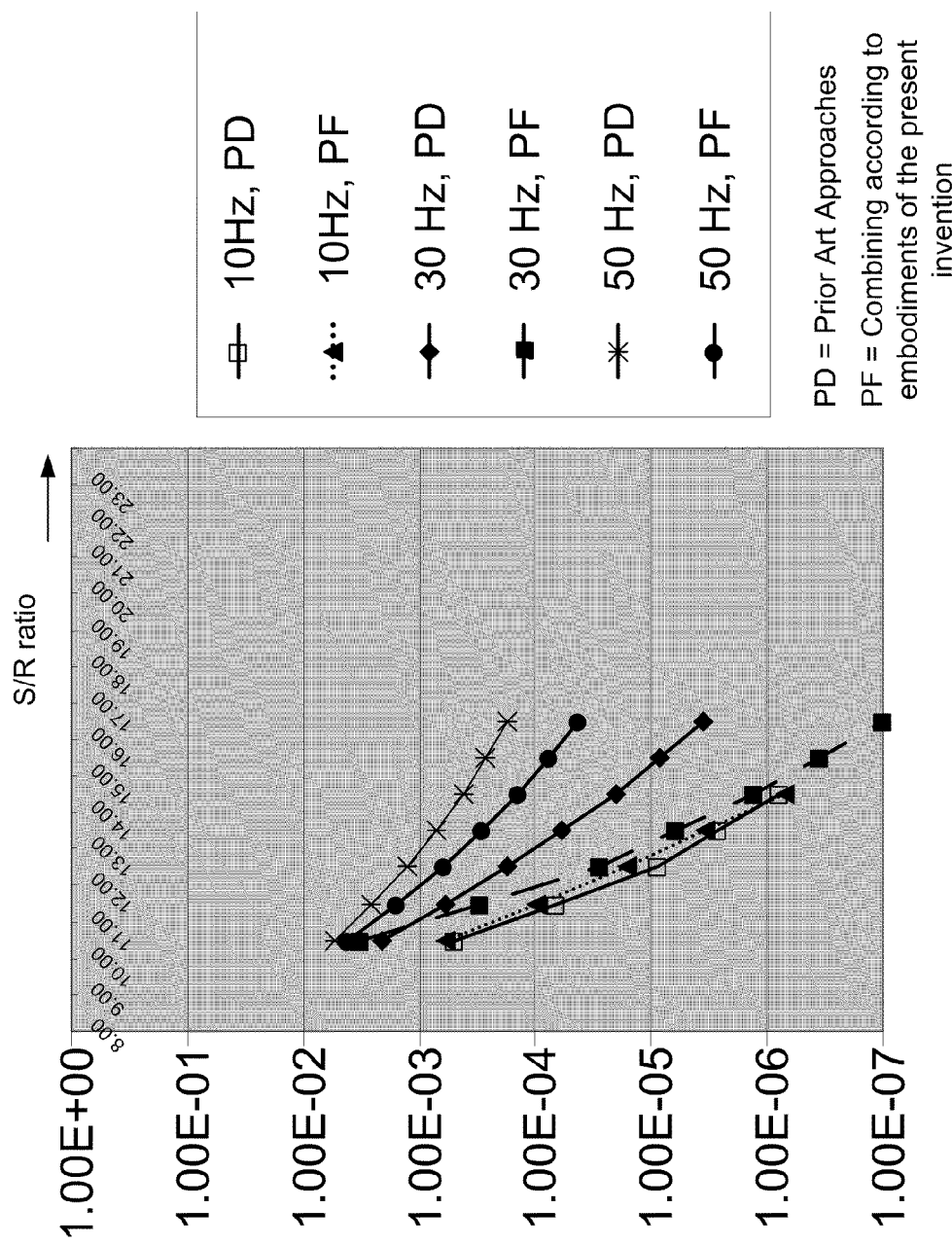
FIG. 5 is the performance of channel estimation error according to an embodiment of the present invention.

FIG. 5 is the performance of channel estimation error according to an embodiment of the present invention. The plots show the bit error rate (BER) in the y-axis as a function of Doppler frequencies. The plots labeled "PD" correspond to the performance obtained by conventional diversity combining techniques such as using a post-demapping approaches. Those labeled "PF" show the BER performance under various Doppler frequencies according to embodiments of the present invention. As shown in FIG. 5, embodiments of the present invention provide lower BER compared to conventional techniques. The numbers in the x-axis above the plots are the S/N (signal-to-noise) ratio. It is expected that the BER under higher Doppler frequencies is also higher; and that the BER according to embodiments of the present invention is also lower than those obtained in the conventional techniques for the same S/N ratio.

Of course, it will be understood by those skilled in the art that the diversity receiver and method for diversity mobile terminals as provided by this invention may not be only limited to OFDM systems, but also applicable to other wireless mobile communication terminals, mobile phone systems, portable TV receivers, etc.

What is claimed is:

1. A diversity receiver comprising:
   a first RF front end module configured to receive a first RF signal and frequency convert the first RF signal and output a first diversity signal;
   a second RF front end module configured to receive a second RF signal and frequency convert the second RF signal and output a second diversity signal;
   a first converter configured to convert the first diversity signal to a first digital time-domain signal;
   a second converter configured to convert the second diversity signal to a second digital time-domain signal;
   a first transformer module for translating the first time-domain signal to a first frequency-domain signal;
   a second transformer module for translating the second time-domain signal to a second frequency-domain signal;
   a first pre-equalizer for pre-equalizing the first frequency-domain signal;
   a second pre-equalizer for pre-equalizing the second frequency-domain signal; and
   a combiner coupled to the first and second pre-equalizers and being configured to combine the first pre-equalized frequency-domain signal and the second pre-equalized frequency-domain signal.

2. The diversity receiver of claim 1 further comprising:
   a first digital front end processing unit interposed between the first converter and the first transformer module, the first digital front end processing unit being configured to filter and calibrate the first diversity signal; and
   a second digital front end processing unit interposed between the second converter and the second transformer module, the second digital front end processing unit being configured to filter and calibrate the second diversity signal.

3. The diversity receiver of claim 1 further comprising a channel estimator coupled to the combiner, wherein the channel estimator comprises a mirror channel estimation window.

4. The diversity receiver of claim 1, wherein each of the first and second frequency-domain signal comprises a plurality of subbands having a frequency bandwidth.

5. The diversity receiver of claim 4, wherein the plurality of subbands comprises a coherence bandwidth, the coherence bandwidth being a factor K smaller than the frequency bandwidth.

6. The diversity receiver of claim 5, wherein each of the first and second transformer modules comprises a 2m-point Fast Fourier Transform (FFT), the 2m value representing a number of points of the FFT, m being chosen as a minimum positive integer value for the number of FFT points to be equal or greater than the factor K for providing a low power transform.

7. The diversity receiver of claim 1, wherein the combiner comprises a bin wise correlator.

8. The diversity receiver of claim 1, wherein each of the first and second pre equalizers comprises a multiplier configured to multiply each of the first and second frequency domain signals with an associated complex channel in digital domain.

9. The diversity receiver of claim 1 further comprising a synchronization module coupled to the combiner and the channel estimator, wherein the synchronization module generates a clock frequency for operating the first and second transformer modules.

10. A method of combining signals in a diversity receiver, the method comprising:
  receiving an RF signal in each of a plurality of diversity signal paths;
  frequency converting each of the RF signals to a corresponding frequency converted diversity signal;
  converting each of the frequency-converted diversity signal to an associated digital time-domain diversity signal;
  translating each of the associated digital time-domain diversity signals to an associated frequency-domain signal, the associated frequency-domain having a plurality of bins;
  pre-equalizing each of the frequency-domain signals; and
  combining the pre-equalized frequency-domain signals to obtain a combined signal.

11. The method of claim 10 further comprising digitally filtering and
  calibrating the time-domain diversity signals before translating them to the frequency-domain signals.

12. The method of claim 10 further comprising estimating a channel based on the combined signal using an enlarged mirror window.

13. The method of claim 10 further comprising deriving a clock frequency based on the combined signal.

14. The method of claim 10, wherein the combining comprises:
  bin-wise correlating each of the plurality of bins; and
  summing the correlated bins.

15. The method of claim 10, wherein each of the plurality of bins comprises a frequency bandwidth equal to a coherence bandwidth of the diversity receiver.

* * * * *